(12) United States Patent
Ushigusa et al.

(10) Patent No.: US 8,172,199 B2
(45) Date of Patent: May 8, 2012

(54) VALVE CONTROL APPARATUS AND FLOW RATE CONTROLLER

(75) Inventors: Yoshihiro Ushigusa, Saitama (JP); Atsutoshi Nakamura, Saitama (JP)

(73) Assignee: Surpass Industry Co., Inc., Saitama (JP)

( * ) Notice: Subject to any disclaimer, the term of this patent is extended or adjusted under 35 U.S.C. 154(b) by 838 days.

(21) Appl. No.: 12/226,367

(22) PCT Filed: May 8, 2007

(86) PCT No.: PCT/JP2007/059487
§ 371 (c)(1),
(2), (4) Date: Oct. 16, 2008

(87) PCT Pub. No.: WO2007/129697
PCT Pub. Date: Nov. 15, 2007

(65) Prior Publication Data
US 2009/0230339 A1   Sep. 17, 2009

(30) Foreign Application Priority Data

May 8, 2006  (JP) .................................. 2006-128922

(51) Int. Cl.
*F16K 31/02* (2006.01)
(52) U.S. Cl. ................ 251/129.05; 251/70; 251/129.11; 318/685; 318/696
(58) Field of Classification Search ............. 251/68, 251/69, 70, 71, 129.05, 129.11; 137/554; 318/685, 696; 310/49, 12.17
See application file for complete search history.

(56) References Cited

U.S. PATENT DOCUMENTS

| 4,694,861 | A | * | 9/1987 | Goodale et al. | 137/624.19 |
| 4,787,410 | A | * | 11/1988 | Fujieda et al. | 137/78.4 |
| 5,240,022 | A | * | 8/1993 | Franklin | 137/1 |
| 5,625,269 | A | * | 4/1997 | Ikeda | 318/696 |
| 6,186,471 | B1 | * | 2/2001 | Genga et al. | 251/129.12 |
| 6,250,323 | B1 | * | 6/2001 | Genga et al. | 137/1 |
| 6,619,613 | B1 | * | 9/2003 | Akamatsu et al. | 251/129.04 |
| 6,781,341 | B2 | * | 8/2004 | Nakamichi et al. | 318/685 |
| 6,854,658 | B1 | * | 2/2005 | Houghton et al. | 236/12.12 |

(Continued)

FOREIGN PATENT DOCUMENTS

JP   61-54502 A   3/1986

(Continued)

OTHER PUBLICATIONS

International Search Report for PCT Appln. No. PCT/JP2007/059487 mailed Jul. 24, 2007.

*Primary Examiner* — John Fristoe, Jr.
*Assistant Examiner* — Matthew W Jellett
(74) *Attorney, Agent, or Firm* — Robert P. Michal; Lucas & Mercanti, LLP

(57) ABSTRACT

A valve control apparatus including a stepping motor coupled to a valve and a motor control unit for controlling the stepping motor is provided. The motor control unit includes a motor control section for applying drive pulses to the pulse motor, a counting section for counting the number of drive pulses applied to the pulse motor, a voltage-drop detecting section for detecting a voltage drop of a drive power supply for the motor control section, and a writing section for writing a count from the counting section in a nonvolatile memory if the voltage-drop detecting section detects the voltage drop.

5 Claims, 7 Drawing Sheets

U.S. PATENT DOCUMENTS

| | | | |
|---|---|---|---|
| 7,148,640 B2* | 12/2006 | Tani | 318/280 |
| 7,168,677 B2* | 1/2007 | Gama et al. | 251/69 |
| 7,377,479 B1* | 5/2008 | Chen | 251/69 |
| 7,556,238 B2* | 7/2009 | Seberger | 251/69 |
| 7,789,370 B2* | 9/2010 | Eriksson | 251/71 |
| 2006/0238039 A1* | 10/2006 | Niedermeyer et al. | 310/49 R |

FOREIGN PATENT DOCUMENTS

| | | |
|---|---|---|
| JP | 6-185257 A | 7/1994 |
| JP | 2003-329698 A | 11/2003 |
| JP | 2003-348895 A | 12/2003 |
| JP | 2004-295350 A | 10/2004 |
| JP | 2004-348227 A | 12/2004 |

\* cited by examiner

VALVE CONTROL APPARATUS AND FLOW RATE CONTROLLER

This application is a U.S. National Phase Application under 35 USC 371 of International Application PCT/JP2007/059487 filed May 8, 2007.

TECHNICAL FIELD

The present invention relates to valve control apparatuses for installation in fluid channels to control the flow rate of a fluid, in various industrial fields, including, for example, chemical plants, semiconductor manufacturing, food, and bioindustry, and also relates to flow rate controllers including such valve control apparatuses.

BACKGROUND ART

Examples of conventionally known flow rate controllers for controlling the amount of fluid flowing through a fluid channel include those using pulse motors for open/close control of valves.

A flow rate controller using a pulse motor, for example, controls the position of a valve during driving by counting the number of input pulses and, when the driving is stopped, moves the valve back to its original position before the entire flow rate controller comes to a stop. This control allows the valve to be controlled the next time driving starts on the assumption that the valve is at the original position.

If the power fails for any reason during the operation, the flow rate controller would stop without moving the valve back to the original position. Thus, if the operation stops before the valve is moved back to the original position, control for returning the valve to the original position (hereinafter referred to as the "return-to-origin control") must be performed before the next time driving starts.

An example of the return-to-origin control is a technique disclosed in Patent Document 1.

Patent Document 1 discloses a technique for temporarily stopping a pulse motor upon detection of its malfunction while driving it in such a direction as to close a valve, further driving the pulse motor in such a direction as to close the valve by a predetermined number of pulses before stopping the pulse motor, and finally driving the pulse motor in such a direction as to open the valve by a specified number of pulses before stopping the pulse motor, thereby detecting the origin of the valve.

Patent Document 2 discloses a technique, using a position sensor that outputs different signals based on the operating position of a driven part such as a valve, for driving a pulse motor in a predetermined direction upon activation, sampling signals output from the position sensor for each predetermined angle of motor driving during the driving, recognizing the current valve position from the sampling variation pattern, and setting the origin of the valve based on the recognized current position. This technique can reduce the amount of driving of the pulse motor when the motor is returned to its origin because a change in the position of a driven part such as a valve is followed by the updating of the origin, thus quickly enabling normal control.

Patent Document 1:
Japanese Unexamined Patent Application, Publication No.
Patent Document 2:
Japanese Unexamined Patent Application, Publication No.

DISCLOSURE OF INVENTION

The invention described in Patent Document 1 above, however, has a problem in that it tends to cause biting of a screw part for driving the valve because the pulse motor may rotate beyond its range of motion; the apparatus breaks down if the biting is so serious that the pulse motor can no longer be driven.

The invention described in Patent Document 2, on the other hand, has a problem in that it increases the size and cost of the apparatus because the origin is set by identifying the valve position using, for example, a rotary encoder or a sensor.

Another approach is to write the valve position in a nonvolatile memory in real time to facilitate the return-to-origin. It is impossible, however, to write the motor position in the nonvolatile memory in real time because the writing of the data in the nonvolatile memory is much slower than the rotational speed of the motor.

An object of the present invention, which has been made in light of the above circumstances, is to provide a compact valve control apparatus and flow rate controller that eliminate the problem of biting of a screw part for driving a valve.

A first aspect of the present invention is a valve control apparatus, for driving a valve for controlling the flow rate of a fluid flowing through a fluid channel, including a stepping motor coupled to the valve and a motor control unit for controlling the stepping motor. The motor control unit includes a motor control section for applying drive pulses to the pulse motor, a counting section for counting the number of drive pulses applied to the pulse motor, a voltage-drop detecting section for detecting a voltage drop of a drive power supply for the motor control section, and a writing section for writing a count from the counting section in a nonvolatile memory if the voltage-drop detecting section detects the voltage drop.

In this valve control apparatus, the motor control unit for controlling the stepping motor coupled to the valve includes the motor control section for applying drive pulses to the pulse motor, the counting section for counting the number of drive pulses applied to the pulse motor, the voltage-drop detecting section for detecting a voltage drop of the drive power supply for the motor control section, and the writing section for writing the count from the counting section in the nonvolatile memory if the voltage-drop detecting section detects the voltage drop. Hence, if the power supply fails for any reason during the operation of the pulse motor, this state is quickly detected, and the current count is stored in the nonvolatile memory.

This allows the current position to be recorded if the motor driving stops for any reason before the valve is returned to its original position. At the next time driving starts, therefore, the valve position can readily be identified by reading the count from the nonvolatile memory. This results in a reduction in the time to shift from the activation of the pulse motor to normal operation.

In addition, the pulse motor can always be driven within its range of motion because the position of the pulse motor can be identified without moving it. This avoids biting of a screw part.

Furthermore, the size of the apparatus can be reduced because the need for a position-detecting sensor such as a rotary encoder can be eliminated.

The above valve control apparatus may further include a period-adjusting section for extending a drive termination period to a predetermined period of time or more. The drive termination period is from voltage-drop detection, at which the voltage-drop detecting section detects the voltage drop, to drive termination, at which the driving of the motor control section stops.

Because the period-adjusting section is provided, the count from the counting section can reliably be written in the nonvolatile memory within the drive termination period. This allows the valve position to be reliably identified at the activation of the pulse motor, thus increasing reliability. The predetermined period of time must at least be set to be longer than a writing period during which the writing section writes the count in the nonvolatile memory.

In the above valve control apparatus, the motor control section may execute return-to-origin control for returning the valve to an origin at the start of driving of the pulse motor by reading the count written in the nonvolatile memory and driving the pulse motor based on the count.

Because the return-to-origin control for returning the valve to the origin is executed at the start of driving of the pulse motor by reading the count written in the nonvolatile memory and driving the pulse motor based on the count, the time required for the return-to-origin control can be reduced.

A second aspect of the present invention is a flow rate controller including a valve for controlling the flow rate of a fluid flowing through a fluid channel and the above valve control apparatus.

A third aspect of the present invention is a motor control unit including a motor control section for applying drive pulses to the pulse motor, a counting section for counting the number of drive pulses applied to the pulse motor, a voltage-drop detecting section for detecting a voltage drop of a drive power supply for the motor control section, and a writing section for writing a count from the counting section in a nonvolatile memory if the voltage-drop detecting section detects the voltage drop.

A fourth aspect of the present invention is a pulse motor apparatus including a pulse motor and the above motor control unit, which controls the pulse motor.

The present invention provides the advantage of eliminating the problem of biting of a screw part for driving the valve and reducing the size of the apparatus.

EXPLANATION OF REFERENCE SIGNS

Figure 1:
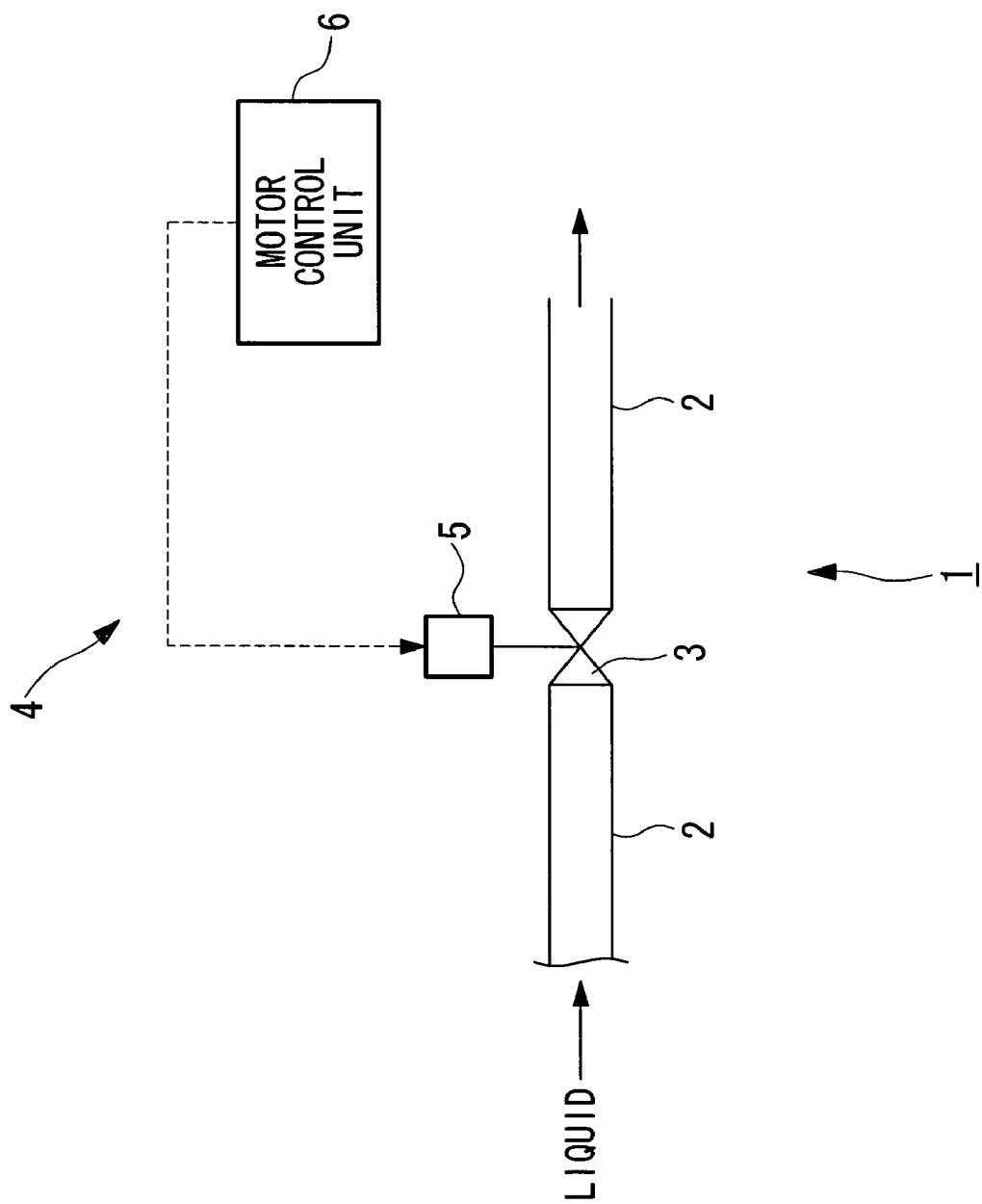
FIG. 1 is a diagram showing, in outline, the configuration of a flow rate controller according to an embodiment of the present invention.

1: flow rate controller
2: fluid channel
3: valve
4: valve control apparatus
5: pulse motor
6: motor control unit
14: diaphragm needle
15a: rotating shaft
16: coupling
17: slider
21: spring
23: case
29: cable
43: port
61: drive power supply
62: microcomputer
63: A/D converter
64: nonvolatile memory
65: voltage-drop detecting section
66: motor control section
67: counting section
68: writing section
74: capacitor
91: Zener diode set

BEST MODE FOR CARRYING OUT THE INVENTION

An embodiment in which a motor control unit of the present invention is applied to a flow rate controller will now be described.

FIG. 1 is a diagram showing, in outline, the configuration of the flow rate controller according to this embodiment. This flow rate controller 1 includes, as main components, a valve 3 provided in a fluid channel 2 to control the flow rate of a fluid flowing through the fluid channel 2 and a valve control apparatus 4 for driving the valve 3. The valve control apparatus 4 includes a pulse motor 5 coupled to the valve 3 and a motor control unit 6 for controlling the pulse motor 5.

Figure 2:
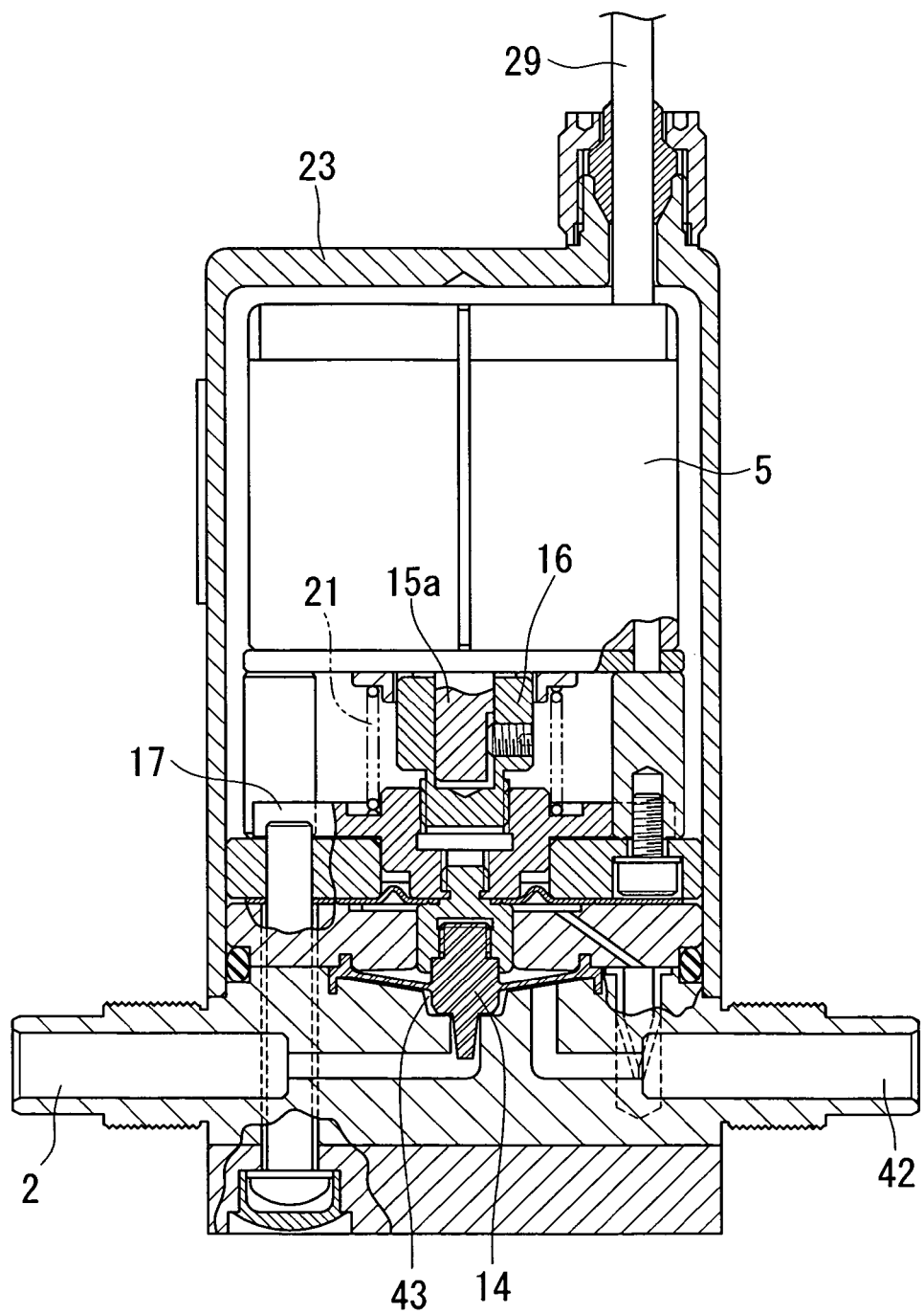
FIG. 2 is a longitudinal sectional view of a case accommodating a valve and a pulse motor shown in FIG. 1.

FIG. 2 is a diagram showing, in outline, the configuration of the valve 3 shown in FIG. 1. The valve 3 in FIG. 1 includes a diaphragm needle 14, for example, as a valve element. This diaphragm needle 14 is integrated with the pulse motor 5 and is accommodated in a case 23.

The pulse motor 5 in the case 23 is connected to the motor control unit 6 through a cable 29. The rotation angle is controlled based on drive signals supplied through the cable 29.

A rotating shaft 15a of the pulse motor 5 is coupled to a coupling 16. The coupling 16 is coupled to a slider 17 via a spring 21. The slider 17 is coupled to the diaphragm needle 14. The diaphragm needle 14 is disposed in a port 43 formed in the fluid channel 2.

The flow rate of a fluid flowing through the fluid channel 2 is adjusted depending on the gap area between the diaphragm needle 14 and the bottom surface of the port 43.

Next, the operation of the valve 10 will be briefly described.

Suppose, for example, that no fluid flows through the port 43 with the diaphragm needle 14 in contact with the bottom surface of the port 43; that is, the valve 3 is completely closed. If the motor control unit 6, to be described later, supplies the pulse motor 5 with a drive signal that causes it to be driven in such a direction as to open the valve, the rotating shaft 15a rotates in such a direction as to lift the diaphragm needle 14 (for example, clockwise as viewed from above in FIG. 1) based on the drive signal.

With this rotation, the coupling 16 coupled to the rotating shaft 15a rotates in the same direction, and accordingly the slider 17 coupled to the coupling 16 moves upward along the motor shaft. As the slider 17 moves upward, it lifts the diaphragm needle 14 coupled to the slider 17 to form a gap between the diaphragm needle 14 and the bottom surface of the port 43, so that the valve 3 is opened.

This allows a fluid to flow into the port 43. After the fluid fills the port 43, it flows sequentially into a fluid outlet portion 42 and then flows out of the fluid outlet portion 42.

In this valve-opening operation, the gap area between the diaphragm needle 14 and the bottom surface of the port 43 is adjusted depending on the number of drive pulses applied to the pulse motor 5. Specifically, the motor control unit 6 increases the gap area to increase the flow rate of the fluid by increasing the number of pulses applied to the pulse motor 5. To reduce the flow rate of the fluid, or to close the valve, on the other hand, closing-direction drive pulses are applied to the pulse motor 5 to rotate the rotating shaft 15a of the pulse motor 5 in the direction opposite the above direction (for example, counterclockwise as viewed from above in FIG. 1), thus gradually reducing the gap area between the diaphragm needle 14 and the bottom surface of the port 43. The flow rate can be eventually reduced to zero by completely closing the diaphragm needle 14.

Next, the motor control unit 6 will be described.

Figure 3:
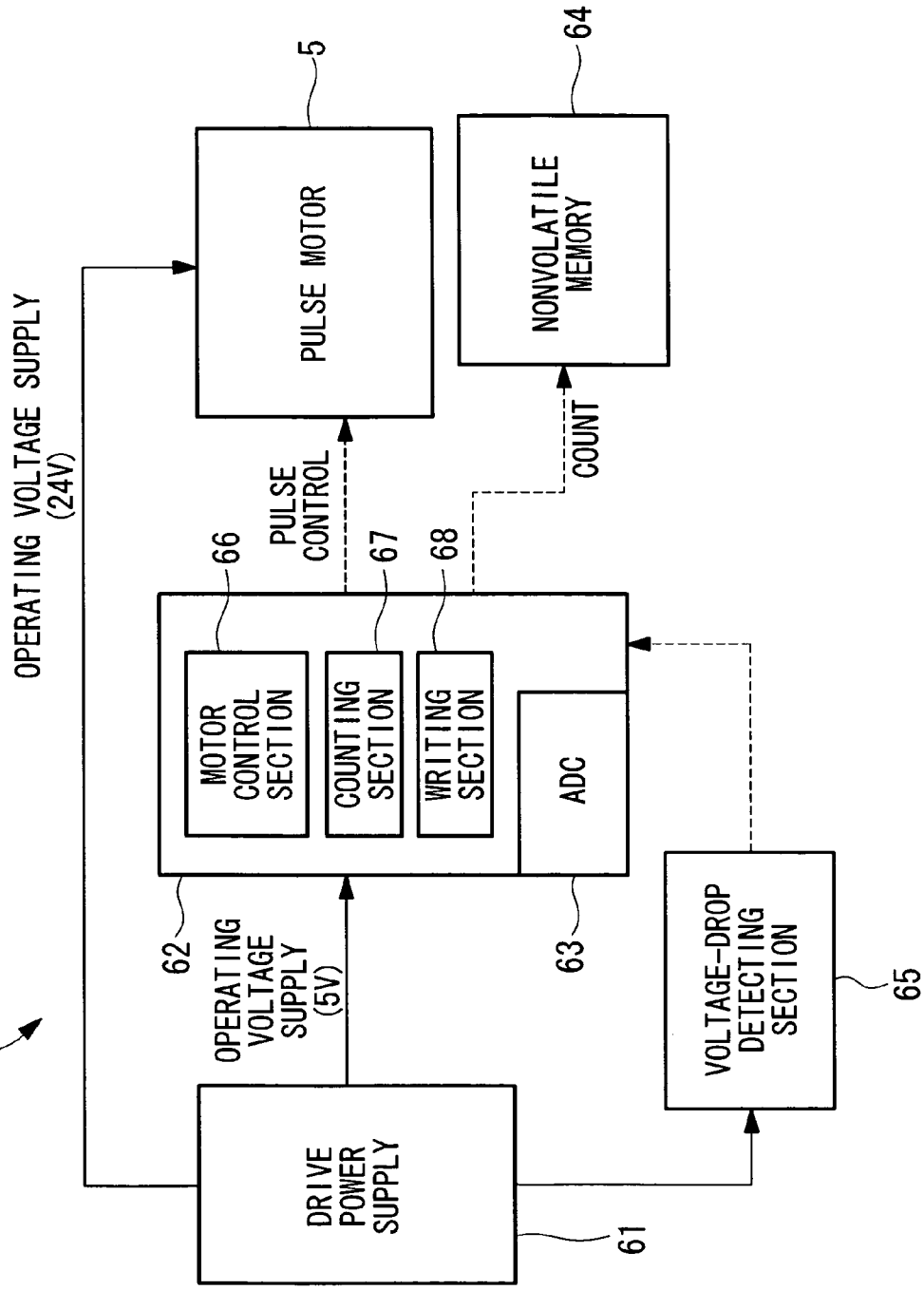
FIG. 3 is a block diagram showing, in outline, the configuration of a motor control unit according to the embodiment of the present invention.

FIG. 3 is a block diagram showing, in outline, the configuration of the motor control unit 6 according to this embodiment.

The motor control unit 6 includes a microcomputer 62 that operates with an operating voltage of 5 V supplied from a drive power supply 61, an A/D converter 63 that operates with an operating voltage of 6 V supplied from the drive power supply 61, a nonvolatile memory 64 such as a ROM, and a voltage-drop detecting section 65 for detecting a voltage drop of the drive power supply 61.

The microcomputer 62 includes a motor control section 66 for applying drive pulses as drive signals to the pulse motor 5, a counting section 67 for counting the number of drive pulses applied to the pulse motor 5, and a writing section 68 for writing the count from the counting section 67 in the nonvolatile memory 64 if the voltage-drop detecting section 65 detects a voltage drop.

In the motor control unit 6 thus configured, during the driving of the valve 3 (see FIG. 1), the motor control section 66 incorporated in the microcomputer 62 applies drive pulses corresponding to a target open/close value of the valve 3 to the pulse motor 5, thereby controlling the rotation angle of the pulse motor 5 to a desired angle. As a result, the diaphragm needle 14 is lifted or lowered, as described above, thus controlling the flow rate of the fluid flowing through the fluid channel 2. At the same time, the counting section 67 counts the number of drive pulses applied to the pulse motor 5.

If the power supplied from the drive power supply 61 is interrupted for any reason during the valve control, the voltage-drop detecting section 65 detects the voltage drop of the drive power supply 61 and notifies the microcomputer 62. In response to the notification of the voltage drop, the writing section 68 of the microcomputer 62 reads a count from the counting section 67 and writes it in the nonvolatile memory 64. This allows the position of the pulse motor 5 to be stored in the nonvolatile memory 64 if the pulse motor 5 stops due to a power interruption during the driving, so that the position of the pulse motor 5 can readily be identified upon restarting.

Figure 4:
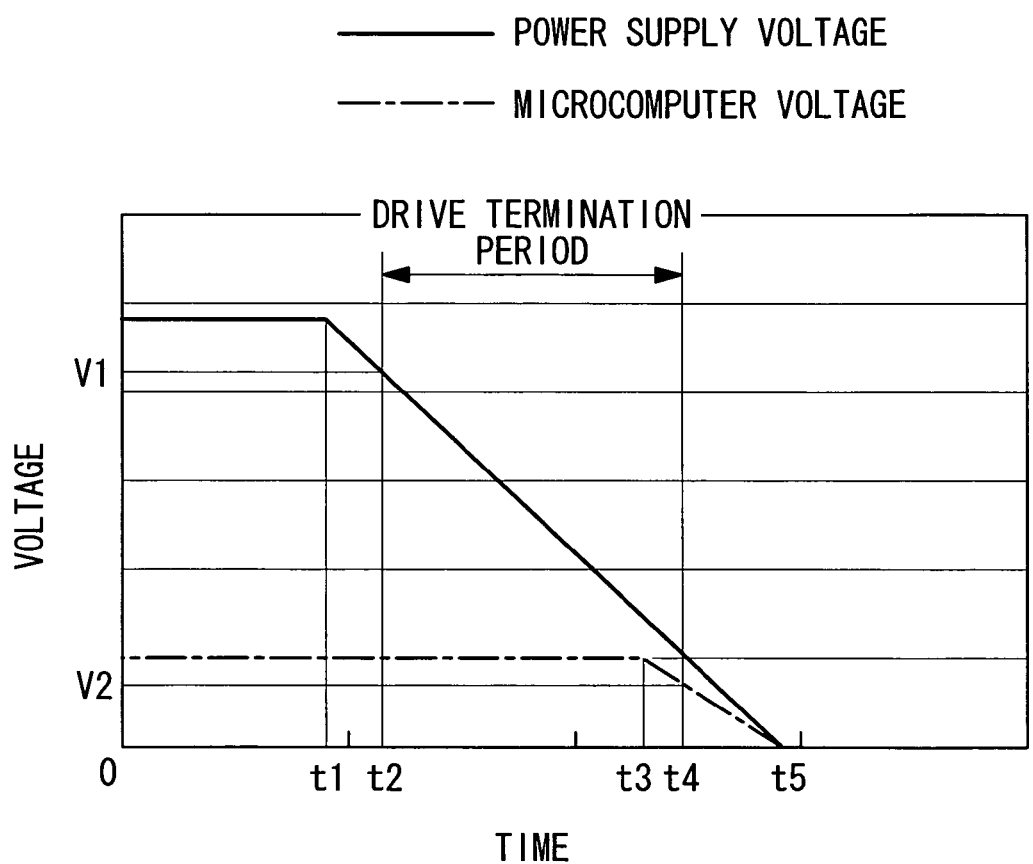
FIG. 4 is a graph showing the progression of power supply voltage and microcomputer voltage in the case where power supplied from a drive power supply is interrupted.

If the power supplied from the drive power supply 61 is interrupted for any reason, as described above, the voltage supplied from the drive power supply 61 to the voltage-drop detecting section 65 (herein referred to as the "power supply voltage"), as indicated by the solid line in FIG. 4, drops gradually from time t1 and reaches zero at time t5. In contrast, the microcomputer voltage supplied to the microcomputer 62, as indicated by the broken line in FIG. 4, remains at 5 V for a predetermined period of time after the power supply voltage starts dropping at time t1, and drops gradually from time t3 and reaches zero at time t5.

Thus, the start of the drop in power supply voltage and the start of the drop in microcomputer voltage are separated by a time difference (for example, about 130 ms) during which the writing section 68 writes the count in the nonvolatile memory 64.

More specifically, the period of time during which the writing section 68 can write in the nonvolatile memory 64 is a drive termination period from voltage-drop detection (at time t2 in FIG. 4), at which the drop in power supply voltage is detected due to the power supply voltage falling below a reference voltage V1 used as a reference by the voltage-drop detecting section 65, to drive termination (at time t4 in FIG. 4), at which the driving of the microcomputer 62 stops due to the microcomputer voltage falling below the minimum operating voltage V2 of the microcomputer.

The drive termination period varies from device to device because it depends on, for example, the circuit configuration of the motor control unit 6; in some cases, there might be a possibility that the operation of the microcomputer 62 cannot be sustained until the writing section 68 finishes writing the count.

Hence, the motor control unit 6 according to this embodiment includes a period-adjusting component (period-adjusting section) for extending the drive termination period to a predetermined period of time or more. The predetermined period of time must at least be set to be longer than the writing period during which the writing section 68 built into the microcomputer 62 writes the count in the nonvolatile memory 64.

Figure 5:
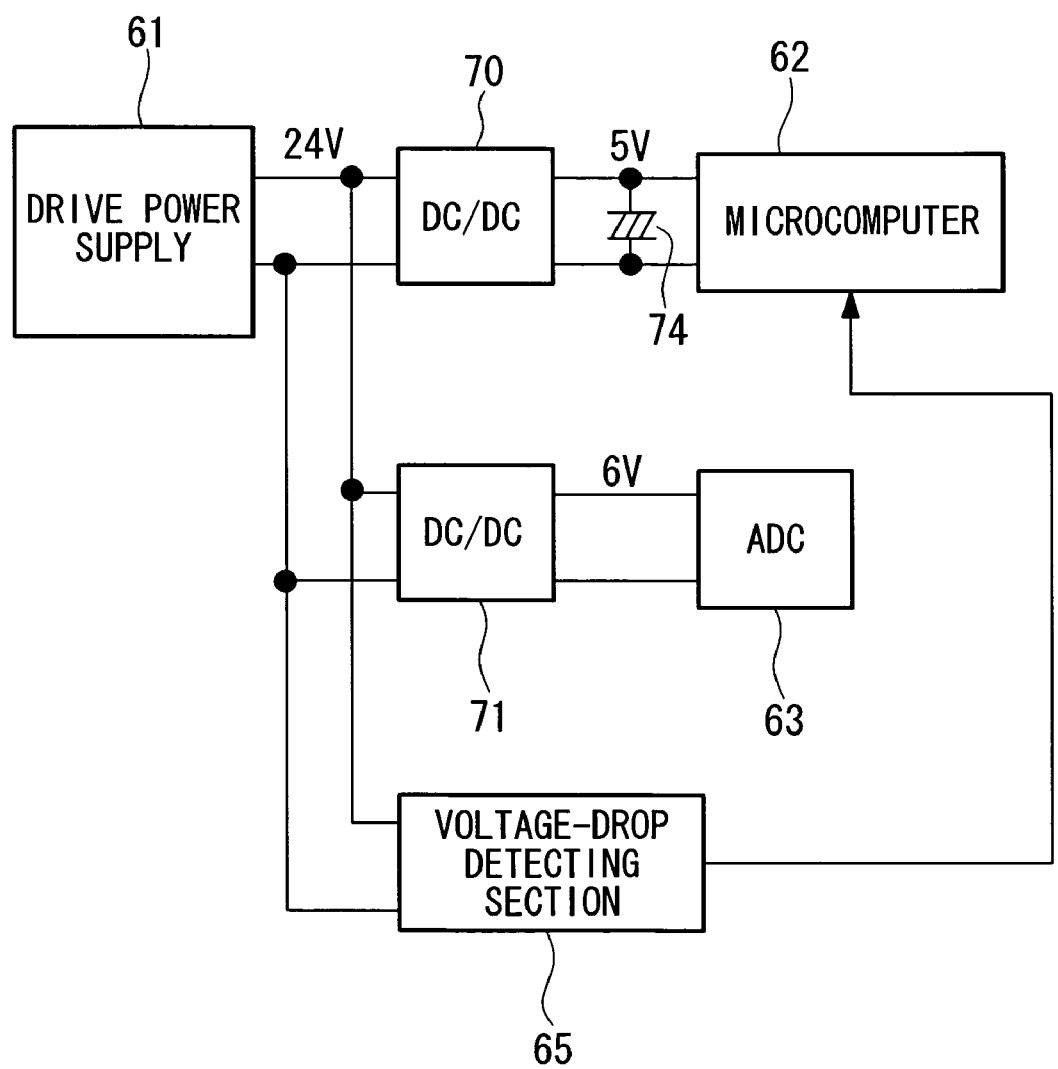
FIG. 5 is a diagram showing an example of a power system of the motor control unit shown in FIG. 3.

FIG. 5 shows an example of the power system of the motor control unit 6. In FIG. 5, a voltage of 24 V output from the drive power supply 61 is input to a DC/DC converter 70 for the microcomputer. The DC/DC converter 70 lowers the voltage to a stable voltage of 5 V before supplying it to the microcomputer 62. The voltage output from the drive power supply 61 is also input to a power converter 71 for the A/D converter. The power converter 71 lowers the voltage to a stable voltage of 6 V before supplying it to the A/D converter 63. The voltage output from the drive power supply 61 is also input directly to the voltage-drop detecting section 65.

In this case, a capacitor (period-adjusting section) 74 is provided between the DC/DC converter 70 for the microcomputer and the microcomputer 62. This allows the time at which the microcomputer voltage drops, namely, time t3, as shown in FIG. 4, to be delayed. As a result, the drive termination period can be extended. The time at which the microcomputer voltage drops can be adjusted by adjusting the capacitance of the capacitor 74.

To extend the above drive termination period, additionally, the voltage-drop detecting section 65 has the following configuration.

Figure 6:
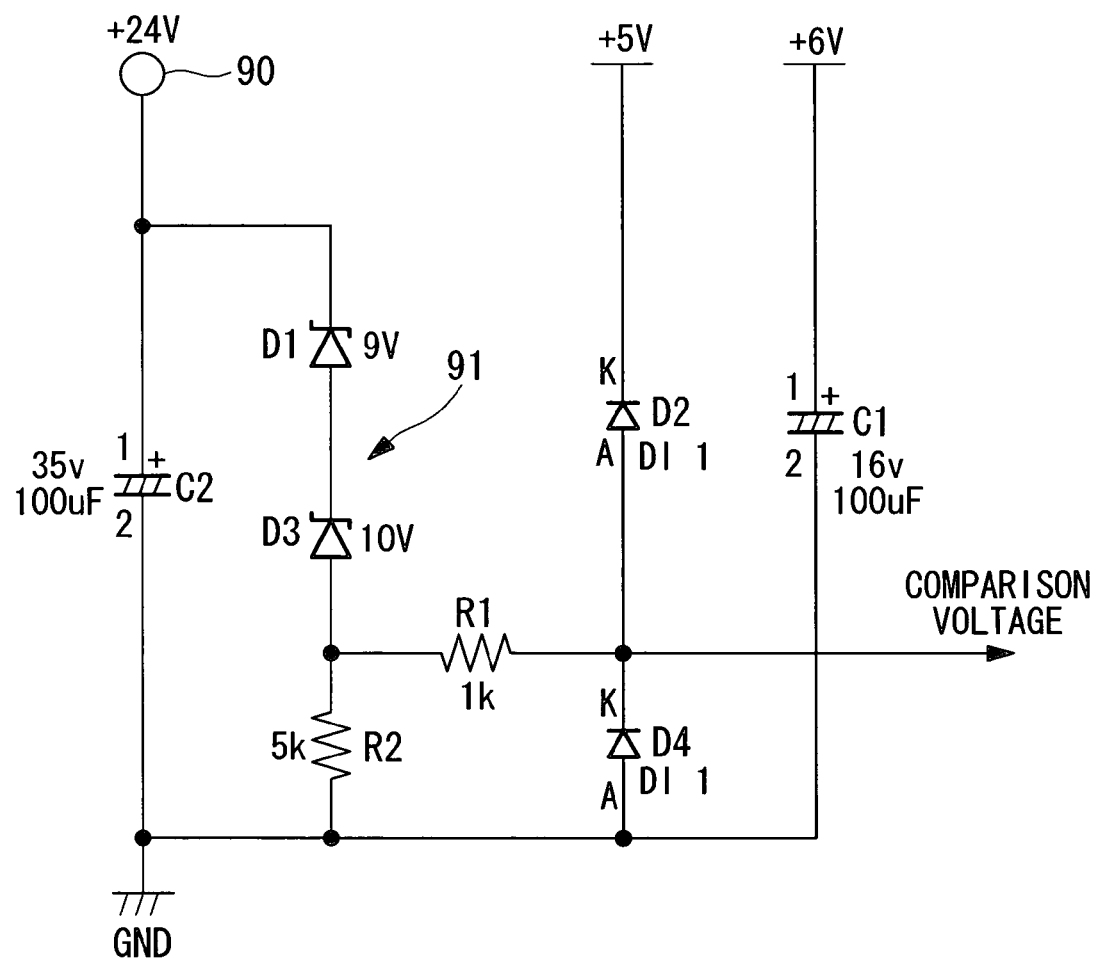
FIG. 6 is a circuit diagram showing an example of the internal configuration of a voltage-drop detecting section shown in FIG. 3.

FIG. 6 is a diagram showing an example of the circuit configuration of the voltage-drop detecting section 65. In FIG. 6, an input terminal 90 through which the power supply voltage of the drive power supply 61 is input is connected to ground through a series-connected Zener diode set 91 and a resistor divider R2. The Zener diode set 91 includes a 9 V Zener diode D1 and a 10 V Zener diode D3 that are connected in series. A node between the Zener diode set 91 and the resistor R2 is connected to, for example, a comparator (not shown) through a resistor R1.

According to the configuration of the voltage-drop detecting section 65, a power supply voltage of 24 V input from the drive power supply to the input terminal 90 is divided by the Zener diode set (period-adjusting section) 91 and the resistor R2 and is input to the comparator (not shown) through the resistor R1 (the voltage input to the comparator will be hereinafter referred to as the "detection voltage"). The detection voltage input to one terminal of the comparator is compared with a reference voltage input to the other terminal of the comparator, and the comparison result is output to the microcomputer 62. If the detection voltage falls below the reference voltage after a drop in the power supply voltage input to the input terminal 90, the output of the comparator is reversed, so that the microcomputer 62 can be notified of the voltage drop.

In the voltage-drop detecting section 65, in this case, the power supply voltage input to the input terminal 90 is divided by the Zener diode set 91 and the resistor R2. Thus, the use of the Zener diode set 91, which totals 19 V (=9 V+10 V), allows the voltage obtained by subtracting 19 V from the power supply voltage to be constantly input to the comparator as the detection voltage.

Figure 7:
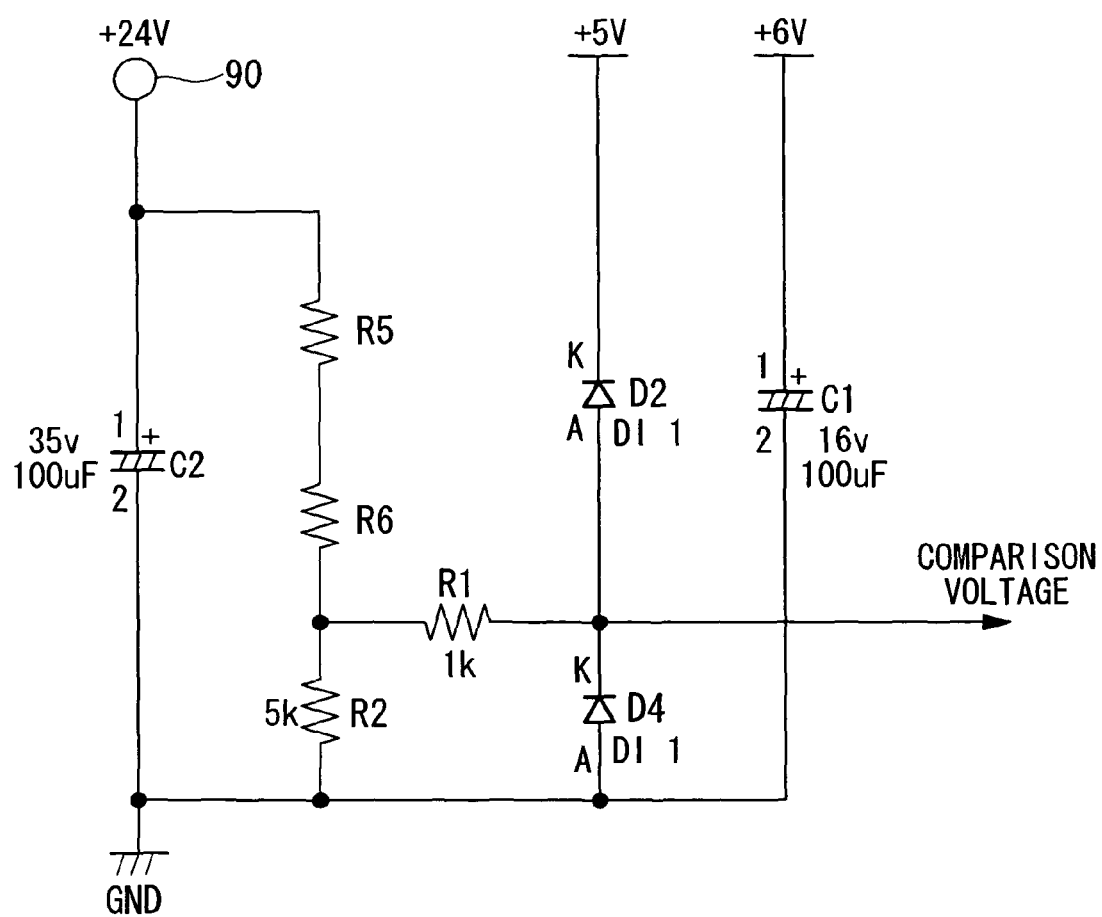
FIG. 7 is a circuit diagram showing another example of the internal configuration of the voltage-drop detecting section shown in FIG. 3.

Accordingly, for example, a drop in power supply voltage can be detected more quickly than in the case where the Zener diode set 91 is replaced with resistors R5 and R6, as shown in FIG. 7.

In the motor control unit 6 according to this embodiment, as described above, if the voltage supplied from the drive power supply 61 is interrupted, this state is quickly detected, and the current count is stored in the nonvolatile memory 64. The count is read from the nonvolatile memory 64 upon restarting, so that the position of the pulse motor 5, in other words, the position of the valve 3, can readily be identified. This eliminates the need for conventional origin retrieval control, thus reducing the time to shift from activation to normal operation.

In addition, the pulse motor can always be driven within its range of motion because the position of the pulse motor 5 can be identified without moving it. This avoids biting of a screw part. Furthermore, the size of the apparatus can be reduced because the need for a position-detecting sensor such as a rotary encoder can be eliminated.

Upon activation of the flow rate controller according to this embodiment, for example, it may be shifted to normal drive control after the motor control unit 6 returns the valve 3 to the origin by reading the count written in the nonvolatile memory 64 and returning the pulse motor 5 to the original position based on the count.

The embodiment of the present invention has been described in detail with reference to the drawings, although its specific configuration is not limited to the above embodiment; design changes, for example, are also encompassed without departing from the spirit of the present invention.

Although the motor control unit 6 is used for control of the valve 3 of the flow rate controller 1 in the embodiment described above, it can also be used for position control of driven parts other than valves.

The invention claimed is:

1. A valve control apparatus for driving a valve for controlling the flow rate of a fluid flowing through a fluid channel, comprising:
 a stepping motor coupled to the valve; and
 a motor control unit for controlling the stepping motor, wherein the motor control unit comprises:
 a motor control section for applying drive pulses to the stepping motor;
 a counting section for counting the number of drive pulses applied to the stepping motor;
 a voltage-drop detecting section for detecting a voltage drop of a drive power supply which supplies an operating voltage for operating the motor control section; and
 a writing section for writing a count, which indicates the number of drive pulses counted by the counting section, in a nonvolatile memory when the voltage-drop detecting section detects the voltage drop,
 wherein the motor control unit is configured to control the stepping motor by having the motor control section apply drive pulses, upon activation of the valve control apparatus, to the stepping motor so that the valve is returned to an origin, the drive pulses corresponding to the count stored in the nonvolatile memory.

2. The valve control apparatus according to claim 1, further comprising a period-adjusting section for adjusting a drive termination period to a predetermined period of time, the drive termination period being from voltage-drop detection at which the voltage-drop detecting section detects the voltage drop to drive termination at which the driving of the motor control section stops.

3. A flow rate controller comprising:
 a valve for controlling the flow rate of a fluid flowing through a fluid channel; and
 a valve control apparatus for driving the valve to control the flow rate of a fluid flowing through the fluid channel, the valve control apparatus comprising:
 a stepping motor coupled to the valve; and
 a motor control unit for controlling the stepping motor, wherein the motor control unit comprises:
 a motor control section for applying drive pulses to the stepping motor;
 a counting section for counting the number of drive pulses applied to the stepping motor;
 a voltage-drop detecting section for detecting a voltage drop of a drive power supply which supplies an operating voltage for operating the motor control section; and
 a writing section for writing a count, which indicates the number of drive pulses counted by the counting section, in a nonvolatile memory when the voltage-drop detecting section detects the voltage drop,
 wherein the motor control unit is configured to control the stepping motor by having the motor control section apply drive pulses, upon activation of the valve control apparatus, to the stepping motor so that the valve is returned to an origin, the drive pulses corresponding to the count stored in the nonvolatile memory.

4. A motor control unit comprising:
 a motor control section for applying drive pulses to a stepping motor;
 a counting section for counting the number of drive pulses applied to the stepping motor;
 a voltage-drop detecting section for detecting a voltage drop of a drive power supply which supplies an operating voltage for operating the motor control section; and
 a writing section for writing a count, which indicates the number of drive pulses counted by the counting section in a nonvolatile memory when the voltage-drop detecting section detects the voltage drop,
 wherein the motor control section is configured to apply driving pulses, upon activation of the motor control unit, to the stepping motor so that the stepping motor is returned to an origin, the drive pulses corresponding to the count stored in the nonvolatile memory.

5. A pulse motor apparatus comprising:
 a stepping motor; and
 a motor control unit comprising:
 a motor control section for applying drive pulses to the stepping motor;
 a counting section for counting the number of drive pulses applied to the stepping motor;

a voltage-drop detecting section for detecting a voltage drop of a drive power supply which supplies an operating voltage for operating the motor control section; and a writing section for writing a count, which indicates the number of drive pulses counted by the counting section in a nonvolatile memory when the voltage-drop detecting section detects the voltage drop, wherein the motor control section is configured to apply driving pulses, upon activation of the motor control unit, to the stepping motor so that the stepping motor is returned to an origin, the drive pulses corresponding to the count stored in the nonvolatile memory.

* * * * *